UNITED STATES PATENT OFFICE.

ALBERT G. MEYER, OF SAN FRANCISCO, CALIFORNIA.

PROCESS OF TREATING PHENACETIN AND PRODUCT.

No. 912,869.     Specification of Letters Patent.     Patented Feb. 16, 1909.

Application filed February 21, 1908. Serial No. 417,074.

*To all whom it may concern:*

Be it known that I, ALBERT G. MEYER, citizen of the United States, residing in the city and county of San Francisco and State of California, have invented new and useful Improvements in Process of Treating Phenacetin and Product, of which the following is a specification.

My invention relates to a process of treating phenacetin and the product.

It consists in the combining of the phenacetin with certain other substances, and a product arising from such combination and treatment, all of which will be more fully explained in the following specification.

In carrying out my process, I take two drams or 120 grains of phenacetin, and mix with approximately 25 minims of chemically pure nitric acid. This mixture, now of a yellowish color and somewhat hardened, is allowed to stand for fifteen or twenty minutes, after which it is powdered, and mixed with 30 minims of pure beechwood creosote. It is now of a rather reddish brown color, and a semi-fluid mass. To this mass is added cold water (2 ounces), and it is then heated and allowed to come to a good boil, after which it is set aside and allowed to cool. After cooling, the water is poured off, and the mass which remains will become quite solid, and is allowed to dry on filtering or blotting-paper. The finished product contains moisture 14%; ortho-nitro-phenacetin 70%; unchanged creosote and nitro-derivatives of creosote 16%.

Phenacetin is very readily acted upon by nitric acid, forming an ortho-nitro compound, the composition of which is:

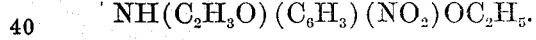

This reaction may be represented as follows:

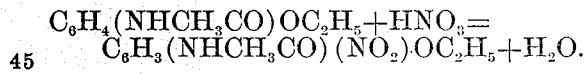

The ortho-nitro-phenacetin is a crystalline compound forming yellow needles which melt at 103° C. It is soluble in ether, alcohol and chloroform. The creosote added is acted upon to a mild extent by the nitric acid, owing to the fact that the quantity of acid added, while sufficient to act thoroughly on the phenacetin, is not sufficient to act on all of the creosote. Beechwood creosote is not a definite compound, but a mixture of phenols and phenol-like bodies, and consisting chiefly of guiacol and creosol. From these bodies and the nitric acid a small proportion of di-nitro-derivatives are formed, but most of the creosote remains unchanged. There is no reaction between the creosote, or the nitro bodies derived therefrom, and ortho-nitro-phenacetin.

The finished product is an antipyretic and a strong germicide. In tuberculosis the dose is approximately 3 to 5 grains taken half an hour after eating the meals and shortly before retiring. The dose for children should be in proportion to the above. It is also desirable that the material should be disposed in capsules.

This product is especially designed for the treatment of infectious diseases, such as tuberculosis, pneumonia, eruptive fevers, and the like.

Having thus described my invention, what I claim and desire to secure by Letters Patent is—

1. The process of treating phenacetin, which consists in mixing therewith a suitable proportion of nitric acid to form a hardened mass, powdering the mass, then mixing it with a suitable proportion of creosote, adding cold water, bringing it to a boil, cooling, and separating the mass from the water, and drying and pulverizing the residue.

2. The process which consists in reacting on phenacetin with nitric acid, then adding thereto creosote in suitable proportions, boiling the mass with water, separating the resulting solid matter from the water, and reducing it to a powder.

3. The composition of matter comprising ortho-nitro-phenacetin, creosote, and nitro-derivatives of creosote, substantially in the proportions specified.

In testimony whereof I have hereunto set my hand in presence of two subscribing witnesses.

ALBERT G. MEYER.

Witnesses:
    CHARLES A. ENFIELD,
    GEO. H. STRONG.